Figure 1:
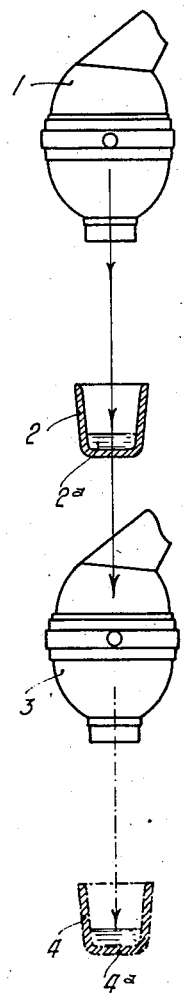

July 9, 1940.  R. PERRIN  2,207,109

MANUFACTURE OF STEEL

Filed Nov. 4, 1938

Inventor:
René Perrin,
By Stebbins, Blenko & Parmelee,
Attys

UNITED STATES PATENT OFFICE 2,207,109

MANUFACTURE OF STEEL

René Perrin, Paris, France, assignor to Societe d'Electrochimie d'Electrometallurgie et des Acieries Electriques d'Ugine, Paris, France, a corporation of France Application November 4, 1938, Serial No. 238,881
In France November 10, 1937

20 Claims. (Cl. 75—46)

The present invention relates to the manufacture of steel and has for its object the production of high grade steel by a rapid and economical procedure.

Steels which are usually made in converters need to be submitted, in order to become high grade steels, to one or more subsequent treatments adapted to reduce their content of elements which are detrimental for the quality of the steel and more particularly phosphorus, sulphur and oxygen. Therefore, a number of processes have been brought into practice which are commonly called "duplex." In these processes the steel which has been made in a converter is transferred to an open hearth or to an electric furnace in which the purification treatments are carried on.

Such duplex processes are:

1. Acid converter plus basic open hearth furnace in which the steel from the said converter is transferred in molten state to a basic open hearth furnace and dephosphorized and then deoxidized.

2. Acid converter plus basic electric furnace, in which the steel from the said converter is finished in the electric furnace.

3. Basic converter plus acid or basic open hearth furnace in which the steel from the basic converter is finished in the open hearth furnace, and 4. Basic converter plus acid or basic electric furnace, in which the steel is finished in the electric furnace.

In each of these processes either a complete dephosphorization and deoxidation and if desired a desulphurization treatment, or, according to the case, the deoxidation alone is performed. Each of these processes entails with respect to the usual processes for the treatment of steel in the converter alone, on the one hand a very important increase of the investment cost with respect to each ton produced and, on the other hand, a very heavy increase of the cost of production for each ton. It is well known, indeed, that the appliances which are necessary for producing a ton of steel in the open hearth or electric furnace are, even if the metal is introduced in these furnaces in a liquid state, much higher than the corresponding expenses for a converter and, furthermore, that the cost of transformation for each ton, is under the same conditions, much higher for an open hearth furnace and an electric furnace than for a converter.

On the other hand, processes for a very rapid purification of steels have been carried into practice in the course of the last years, which processes are applied outside the converter or open hearth furnace and which need no supply of external heat, for instance by putting the metal into intimate contact or violently intermixing it with a slag which is suitable for obtaining the desired purification. But when a plurality of successive purification operations are to be utilized, i. e., outside the converter or furnace by the processes above referred to, which require the use of several different slags the metal is likely to undergo in the course of these operations an important cooling which entails inconveniences for the casting operation and the quality of the metal. Such a cooling is produced more particularly in the plants which are not provided with mechanical appliances in a sufficient quantity for allowing to very rapidly make such manipulations.

The present invention eliminates these various troubles by providing a process for the purification of steel with respect to impurities which cannot be eliminated by the action by a single slag or of a single operation in the converter and accomplishes this without a corresponding increase of the investment cost with respect to each ton produced and without appreciable increase of the cost of the production per ton. This process essentially consists in carrying out the dephosphorization by means which are already known per se either in the converter itself when it is a basic converter, or in a ladle, when the converter is a basic or acid converter, then in transferring the steel to a converter, e. g., to an acid converter, which can be the same as the converter which has been used for the making of the Bessemer steel, and then in causing to act on this steel, in the said acid converter, such a quantity of a body the oxide of which has a high formation heat that, when blowing for a very short time, the combustion of the so added body develops a quantity of heat which is sufficient to bring the steel to the high temperature which is necessary for allowing it to be cast either directly or after a subsequent deoxidation operation. Thus the cooling effect, which is due to the dephosphorization treatment and to the transfer of the steel, is balanced. The steel is thereafter deoxidized by any known means.

Among the bodies which can be used in the acid converter for increasing the temperature of the steel, silicon is particularly advantageous. Silicon is added preferably in the form of a silicon alloy, for instance of ferro-silicon.

If desired, a certain proportion of manganese can be simultaneously added with the silicon in order to provide a better protection of the steel against oxidation due to the blowing operation.

The addition of the silicon and of the manganese can be made, e. g., in the form of silicomanganese.

Silicon can be added to the steel either in the reheating acid converter itself or in the ladle used for the transfer of the steel to the said converter, more particularly when the dephosphorization is not made in a ladle.

One or more alloying elements, for instance nickel, can be added to the steel in the acid reheating converter.

Two working methods for carrying out the invention are given below by way of non-limitative examples.

1. A steel made in an acid converter and containing about 0.1% of phopshorous is violently poured in a thick jet from a height into a ladle containing a basic and oxidizing slag which may be liquid or solid. In the latter case the slag can either have been completely prepared say by a fusion of its constituents and further, after cooling, by a crushing operation and be introduced in the ladle in a solid state, or have been prepared as a mixture of the solid slag constituents. The violent pouring operation is performed after having previously eliminated the acid slag from the converter or while retaining the said slag in the converter. By this operation, which is known per se, a dephosphorized steel is obtained.

From this ladle the steel is transferred, while eliminating or retaining the dephosphorization slag, to an acid converter from which it has just been cast or to another acid converter. Then 0.4% by weight of the silicon, for instance, is added to the steel as silicon or ferro-silicon, as well as 0.6% of manganese in order to protect the steel against oxidation. The bath is then blown for a very short period of time, say for instance a few seconds, the result of which is that the steel is strongly heated due to the combustion of the silicon and of a portion of the manganese but is not materially decarburized.

If necessary, the steel can then be brought to its final composition by known means and if it is deemed expedient a more or less complete deoxidization can be made by an usual known process and more particularly by a violent intermixing with a previously molten fluid slag which is poor in iron oxide. Thus in an exceedingly short time, at the cost of putting out of normal action an acid converter during a very short time and without needing an open hearth furnace or an electric steel furnace, a steel is obtained which is equivalent to the steel which was formerly obtained by a common "duplex" process: converter—open hearth furnace or converter—electric furnace.

2. In the case of a basic converter the process is the same but in this case instead of making the dephosphorization in a ladle by putting the metal into more or less intimate contact with a dephosphorizing slag or with dephosphorizing substances, it is possible to obtain the dephosphorization directly in the basic converter either at the cost of an overblowing of the steel or, preferably, by eliminating the Thomas slag after a first blowing operation and then by introducing into the converter a second dephosphorization slag and by blowing again during a short period of time according to an already known process, after which the so dephosphorized steel is transferred to an acid converter after having eliminated or retained the slag from or in the basic converter and, as in the above described case of an initial acid converter, the silicon or other body the oxide of which has a high formation heat, is added while operating moreover as above mentioned in relation with the operation in a first acid converter. In this case the silicon may be added not in the acid converter but in the ladle which is used for the transfer of the steel from the first converter to the second.

The appended drawing diagrammatically shows by way of example several manners of carrying into practice the process according to the invention.

In this drawing:

Figure 1 corresponds to an operation in which the dephosphorization is carried out in a ladle while the raising of the temperature of the metal is made in a converter other than the converter which has been used for making the steel, a deoxidization in a ladle being proposed.

Figure 2:
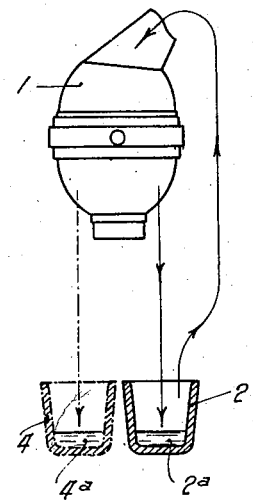

Figure 2 corresponds to an operation in which the dephosphorization is carried out in a ladle while the raising of the temperature of the steel is made in the same converter as that which has been used for making the steel, a deoxidization in the ladle being also proposed.

Figure 3:

Figure 3 corresponds to an operation in which the dephosphorization is carried out in the converter which has been used for making the steel while the raising of the temperature of the metal is made in another converter, a deoxidization in a ladle being again proposed.

In the case illustrated in Figure 1 the steel is made according to an usual process in a Bessemer converter 1, i. e., in an acid converter. The dephosphorization is carried out in the ladle 2 which contains a very fluid dephosphorization slag 2ᵃ, for instance a lime and iron oxide slag, by violently pouring the metal in a thick jet from a height onto the said slag, so as to form a kind of emulsion of the slag and metal. After decantation the dephosphorized metal is transferred into a Bessemer converter 3. Thus a converter which is different from the first one and in which a certain quantity of silicon is caused to act upon the steel may be used. The silicon may be introduced either directly into the converter or previously into the ladle 2 after separating the dephosphorization slag. The charge is blown in this converter 3 during the time which is necessary for strongly stirring the metal and the added elements. This blowing operation is given a duration, a few seconds for instance, which is sufficient for oxidizing the silicon, during which operation the heat which is developed by the oxidation of the silicon raises the temperature of the metal bath. The so heated metal can be either directly cast when a very small oxygen content is not aimed at, or deoxidized, more particularly by violently pouring the metal in a thick jet from a height into the ladle 4 which contains a deoxidation slag 4ᵃ, for instance a very fluid acid slag which is poor in iron oxide, the thickness of the jet and the pouring height being sufficient for producing a kind of an emulsion of the slag and metal. After decantation the metal can be cast. Owing to the combustion of the silicon in the converter 3 it possesses a temperature which is suitable for the casting operation. In either case, when casting without or with a deoxidization, the quantity of silicon which is added to the steel and the duration of the blowing are proportioned to the final temperature to be obtained for the casting operation, this quantity and this duration being determined in each case by experiments.

In the case of Figure 2 the steel having been made in the converter 1 is dephosphorized as in the case of Figure 1, for instance by pouring it in a thick jet from a height into a ladle 2 which contains a dephosphorization slag 2a. After decantation the metal is returned to the converter 1 where added silicon is caused to act upon the steel during a blowing operation of short duration, the silicon being added in such a proportion that the casting temperature has the desired value, then it is poured into a ladle 4 as in the case of Figure 1, without or after a deoxidizing operation.

In the case of Figure 3 the converter 1 is a Thomas converter, i. e., a basic converter, and in this converter the dephosphorization of the steel is obtained by simply overblowing the steel or by eliminating the slag after a first blowing period and replacing it by a fresh slag, and by then terminating the dephosphorization by a complementary blowing. The so dephosphorized metal is transferred to a Bessemer converter (i. e., an acid converter) 3 and silicon is caused to act upon the steel in the said converter by means of a short blowing operation, the silicon being added in such a proportion that its combustion raises the temperature of the bath and brings it to the desired value. Then the steel is cast directly or a deoxidization operation is first realized in a ladle as in the case of Figures 1 and 2.

What I claim is:

1. The process of making steel which comprises blowing a charge of iron in an acid converter to reduce its carbon content, thereafter dephosphorising the steel by treating it with a dephosphorizing slag, and reheating the molten steel by adding to it at least one metal of the class consisting of silicon and manganese and blowing the steel in an acid converter.

2. The process of making steel having a temperature that is convenient for casting which comprises blowing steel in an acid converter, dephosphorizing the said steel outside of the said converter without external heat, transferring the so dephosphorized steel into a second acid converter and causing such a proportion of a body the oxide of which has a high formation heat to act on the steel therein by means of a short blowing that the steel shows the desired casting temperature, and casting the steel.

3. The process of making high grade steel having a temperature that is convenient for casting which comprises blowing steel in an acid converter, dephosphorizing the said steel outside of the said converter without external heat, transferring the so dephosphorized steel into a second acid converter and causing such a proportion of a body the oxide of which has a high formation heat to act on the steel therein by means of a short blowing, that the steel shows the desired casting temperature after a next deoxidising operation outside the converter and without supply of external heat, and casting the steel.

4. The process of making steel which comprises blowing a charge of iron in an acid converter to reduce its carbon content, thereafter dephosphorizing the steel by treating it with a dephosphorizing slag, reheating the molten steel by adding to it at least one metal of the class consisting of silicon and manganese and blowing the steel in an acid converter and deoxidizing, and casting the steel.

5. The process of making steel having a temperature that is convenient for casting which comprises blowing a charge of iron in a basic converter to reduce its carbon content, dephosphorizing the steel in the said converter, transferring the so dephosphorized steel into an acid converter, causing such a proportion of a body the oxide of which has a high formation heat to act on the steel therein by means of a short blowing that the steel shows the desired casting temperature but the steel is not materially decarburized, and casting the steel.

6. The process of making high grade steel having a temperature that is convenient for casting, which comprises blowing a charge of iron in a basic converter, to reduce its carbon content, dephosphorizing the steel in the said converter, transferring the so dephosphorized steel into an acid converter, causing such a proportion of a body the oxide of which has a high formation heat to act onto the steel therein by means of a blowing so short that the steel is not materially decarburized but long enough that the steel possesses the desired casting temperature after a next deoxidizing operation outside the converter and without external heat, deoxidizing the steel outside of the said acid converter without external heat, and casting the steel.

7. The process of making steel having a temperature that is convenient for casting, which comprises blowing a charge of iron in an acid converter to reduce its carbon content, dephosphorizing the said bath outside of said acid converter, adding thereto such a proportion of silicon and blowing for such a short period of time the said bath together with the silicon, that the bath possesses the desired casting temperature, and casting the steel.

8. The process of making steel having a temperature that is convenient for casting which comprises blowing a charge of iron in an acid converter to reduce its carbon content, dephosphorizing the said steel by violently pouring it in thick jet from a height onto a dephosphorizing slag placed in the bottom of a ladle, separating the dephosphorized steel from the slag, adding thereto such a proportion of a reducing body the oxide of which has a high formation heat that when it is desired to cast the steel, the latter possesses the desired casting temperature, transferring the so added steel into a converter, blowing the charge therein for a short period of time, and casting the steel.

9. The process of making steel having a temperature that is convenient for casting which comprises blowing a charge of iron in an acid converter to reduce its carbon content, dephosphorizing the said steel by violently pouring it in thick jet from a height onto a dephosphorizing slag placed in the bottom of a ladle, separating the dephosphorized steel from the slag, transferring the dephosphorized steel to a converter, adding therein to the steel such a proportion of a body having a high formation heat that when it is desired to cast the steel, the latter possesses the desired casting temperature, blowing the so added steel in the said converter for a short period of time, and casting the steel.

10. The process of making high-grade steel without any treatment either in an open hearth or electric furnace, which comprises blowing a charge of common pig iron in a converter and dephosphorizing it, adding to the molten dephosphorized steel a readily oxidisable metal, again blowing the steel in a converter for a time so short that the steel is not materially decarburized and subjecting the steel to a deoxidising treatment in a ladle.

11. The process of making steel having a temperature that is convenient for casting, without any treatment either in an open hearth or electric furnace, which comprises producing steel in a converter, dephosphorizing the said steel by an operation which lowers the temperature of the steel to such an extent that it cannot be properly cast, causing such a proportion of a body the oxide of which has a high formation heat to act on the said dephosphorized steel by means of a blowing in a converter for a time so short that the steel is not materially decarburized but that the steel shows the desired casting temperature, and casting the steel.

12. The process of making high grade steel having a temperature that is convenient for casting without any treatment either in an open hearth or electric furnace, which comprises producing steel in a converter, dephosphorizing the said steel, causing such a proportion of a body the oxide of which has a high formation heat to act on the said dephosphorized steel by means of a blowing in a converter for a time so short that the steel is not materially decarburized but that the steel shows the desired casting temperature after a next deoxidising operation outside the converter without external heat, deoxidizing the steel outside the converter without external heat, and casting the steel.

13. The process of making steel having a temperature that is convenient for casting without any treatment either in an open hearth or electric furnace, which comprises producing steel in a converter, dephosphorizing the said steel by an operation which lowers the temperature of the steel to such an extent that it can not be properly cast, causing silicon to act on the steel by means of a blowing in a converter for a time so short that the steel is not materially decarburized, and casting the steel.

14. The process of making high grade steel having a temperature that is convenient for casting without any treatment either in an open hearth or electric furnace, which comprises producing steel in a converter, dephosphorizing the said steel, causing such a proportion of silicon to act on the steel by means of a blowing in a converter for a time so short that the steel is not materially decarburized but that the steel possesses the desired casting temperature after a next deoxidizing operation outside the converter without external heat, deoxidizing the steel outside the converter without external heat, and casting the steel.

15. The process of making high grade steel having a temperature that is convenient for casting without any treatment either in an open hearth or electric furnace, which comprises producing steel in a converter, dephosphorizing the said steel, transferring it into a second converter, causing such a proportion of silicon to act on the steel in the said second converter by means of a blowing for a time so short that the steel is not materially decarburized but that the steel possesses the desired casting temperature after a next deoxidizing operation outside the converter and without external heat, deoxidizing the steel outside the said second converter without external heat, and casting the steel.

16. The process of making steel having a temperature that is convenient for casting, without any treatment either in an open hearth or electric furnace, which comprises producing steel in a converter, dephosphorizing the said steel by an operation which lowers the temperature of the steel to such an extent that it can not be properly cast, causing such a proportion of a body the oxide of which has a high formation heat and of manganese to act on the steel by means of a short blowing in a converter that first, the steel possesses the desired casting temperature and, second that it is not appreciably further oxidized, and casting the steel.

17. The process of making steel having a temperature that is convenient for casting without any treatment either in an open hearth or electric furnace, which comprises producing steel in a converter, dephosphorizing the said steel by an operation which lowers the temperature of the steel to such an extent that it can not be properly cast, transferring the dephosphorized steel to a converter, blowing the said steel for a short period of time together with an alloying element and such a proportion of a body the oxide of which has a high formation heat that after the said short blowing the steel possesses the desired casting temperature, said short blowing being such that the steel is not materially decarburized, and casting the steel.

18. The process of making steel, which comprises producing steel in a converter and dephosphorizing the steel by an operation which lowers the temperature of the steel to such an extent that it can not be properly cast, adding to the dephosphorized steel silicon in amount of the order of 0.4% by weight and blowing the steel in a converter for a time so short that the steel is not materially decarburized.

19. The process of making steel, which comprises producing steel in a converter and dephosphorizing the steel by an operation which lowers the temperature of the steel to such an extent that it can not be properly cast, ading to the dephosphorized steel, a material the oxide of which has a high heat of formation but of a character not to substantially raise the carbon content of the steel, and blowing the steel in a converter for a time so short that the steel is not materially decarburized.

20. The process of making steel, which comprises producing steel in a converter and dephosphorizing the steel by an operation which lowers the temperature of the steel to such an extent that it can not be properly cast, adding to the dephosphorized steel, a material the oxide of which has a high heat of formation, and blowing the steel for a very short period in a converter, the amount of said added material being only substantially sufficient in conjunction with said very short blow to compensate for the loss of heat incident to the dephosphorization of the steel.

RENÉ PERRIN.